Figure 1:
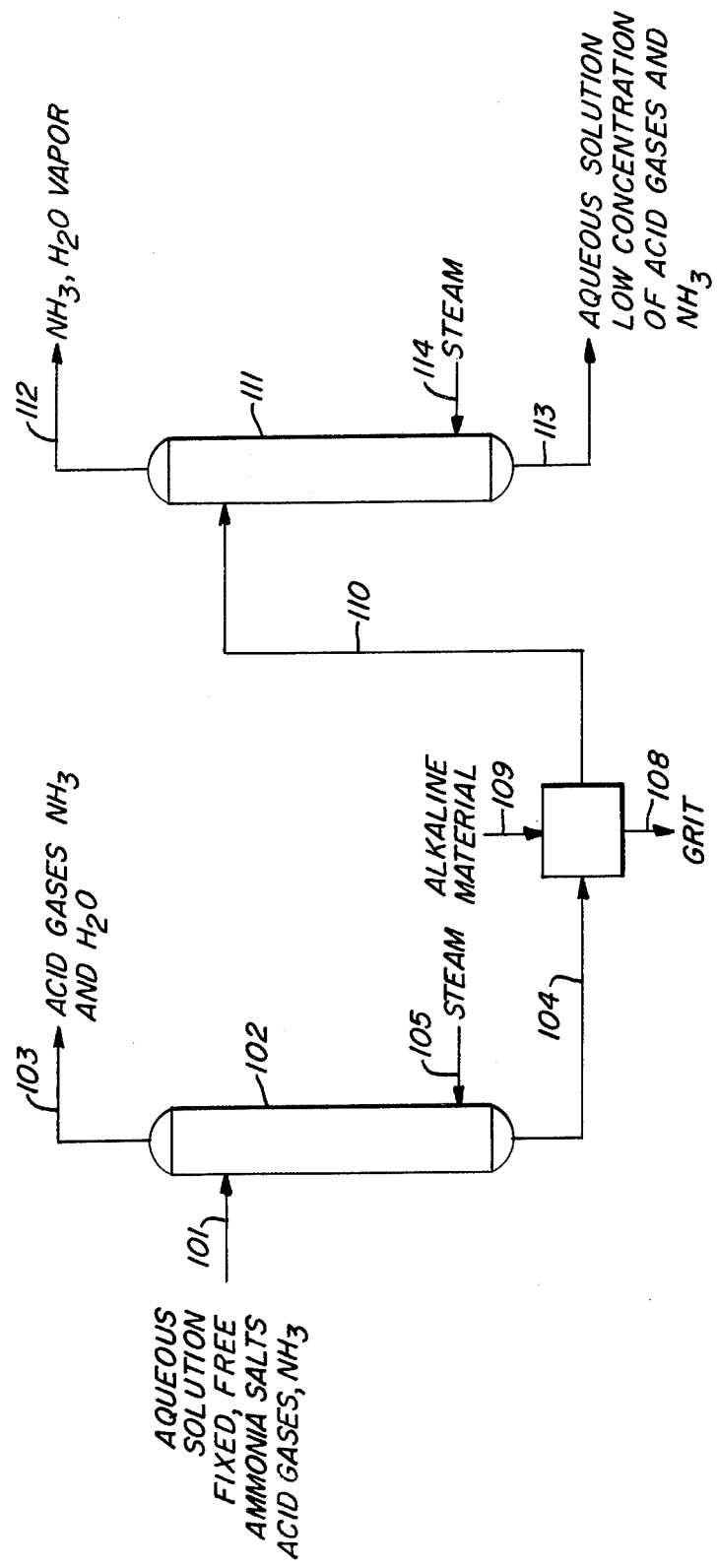

United States Patent [19]

Didycz et al.

[11] 4,260,462
[45] Apr. 7, 1981

[54] PROCESS FOR SEPARATING ACID GASES AND AMMONIA FROM DILUTE AQUEOUS SOLUTIONS THEREOF

[75] Inventors: William J. Didycz, Whitehall Borough; Donald Glassman, Mount Lebanon Borough; Edward E. Maier, Plum Borough; George T. Saniga, Penn Hills Township, Allegheny Count, all of Pa.

[73] Assignee: United States Steel Corporation, Pittsburgh, Pa.

[21] Appl. No.: 909,861

[22] Filed: May 26, 1978

Related U.S. Application Data

[63] Continuation of Ser. No. 633,522, Nov. 19, 1975, abandoned.

[51] Int. Cl.³ ............................ C02F 1/04; B01D 3/38
[52] U.S. Cl. ......................................... 203/22; 203/11; 203/25; 203/26; 203/36; 203/37; 203/79; 203/80; 203/92; 423/357

[58] Field of Search ...................... 203/22, 24, 26, 23, 203/25, 36, 37, DIG. 9, 92, 96, 71, 73, 79, 85, 83, 80, 10, 11, 12, 27; 202/180, 154; 423/356, 357; 210/42 R

[56] References Cited

U.S. PATENT DOCUMENTS

| 1,744,261 | 1/1930 | Cooke | 208/358 |
| 2,276,089 | 3/1942 | Ragatz | 203/22 |
| 2,785,114 | 3/1957 | Schmalenbach | 203/22 |
| 3,278,423 | 10/1966 | Millar | 203/36 |
| 3,324,010 | 6/1967 | Bauer et al. | 203/1 |
| 3,399,120 | 8/1968 | Lovett | 203/84 |
| 3,445,345 | 5/1969 | Katzen et al. | 203/25 |
| 3,639,497 | 2/1972 | Martel et al. | 203/25 |

Primary Examiner—Wilbur L. Bascomb, Jr.
Attorney, Agent, or Firm—W. Gary Goodson

[57] ABSTRACT

A process is described for the removal of acid gases and ammonia from dilute aqueous solutions. This is achieved by two separate and successive distillations. In the first distillation, substantially all of the acid gases and free ammonia are removed. In the second distillation, substantially all of the fixed ammonia is removed. Exemplary aqueous solutions are waste waters from coke oven and coal conversion plants.

28 Claims, 2 Drawing Figures

PROCESS FOR SEPARATING ACID GASES AND AMMONIA FROM DILUTE AQUEOUS SOLUTIONS THEREOF

This is a continuation of application Ser. No. 633,522, filed Nov. 19, 1975, now abandoned.

BACKGROUND OF THE INVENTION

Aqueous solutions of acid gases and ammonia also having fixed and free ammonia salts can be obtained from the washing of coal carbonization gases, e.g., the by-products from coke ovens. The separation of the ammonia and acid gases is practiced by using distillation apparatus with a free and a fixed ammonia section, see "Industrial Chemistry", E. R. Riegel, Reinhold Publishing Corporation, N.Y., 1942, pp 265–268. This system, however, has had problems in reaching consistent low levels of ammonia and acid gases in the effluent aqueous solution, in efficiency of separation of both acid gases and ammonia, energy consumption per gallon of aqueous solution treated, deposits or solids or fouling in the apparatus, stable operation, and in large quantities of sludge formed when lime is used to free the fixed ammonia.

OBJECTS OF THE INVENTION

It is among the objects of this invention to provide improvements in the separation of ammonia and acid gases from dilute aqueous solutions thereof which also contain fixed and free ammonia salts. Included among these improvements are to increase the degree of separation between the gases and the solution; to provide consistent concentrations in the thus treated solutions, to substantially deplete both ammonia and acid gas concentrations in said solution especially where both ammonia and cyanides are present; to increase the efficiency of separation by providing apparatus particularly designed for ammonia removal; and, to increase the economy of said separation by reducing the consumption of energy for said separation and reducing the quantity of lime sludge produced, where lime is used for the alkali component for the second distillation.

It is intended to apply these improvements to the separations where the acid gases include $CO_2$, $SO_2$, $H_2S$, $HCN$, and mixtures thereof. Particularly where the aqueous solution is an effluent collected from the processing of coke oven gas and other similar aqueous streams, it is an advantage of this invention that it can be combined with biological degradation of other chemical species in the solution to provide a purified aqueous stream. When this invention is used in combination with biological degradation, the treated water has extremely low cyanide content. These and other objects as are apparent from this specification are equally within the scope of our invention.

DESCRIPTION OF THE INVENTION AND FIGURES

Figure 2:
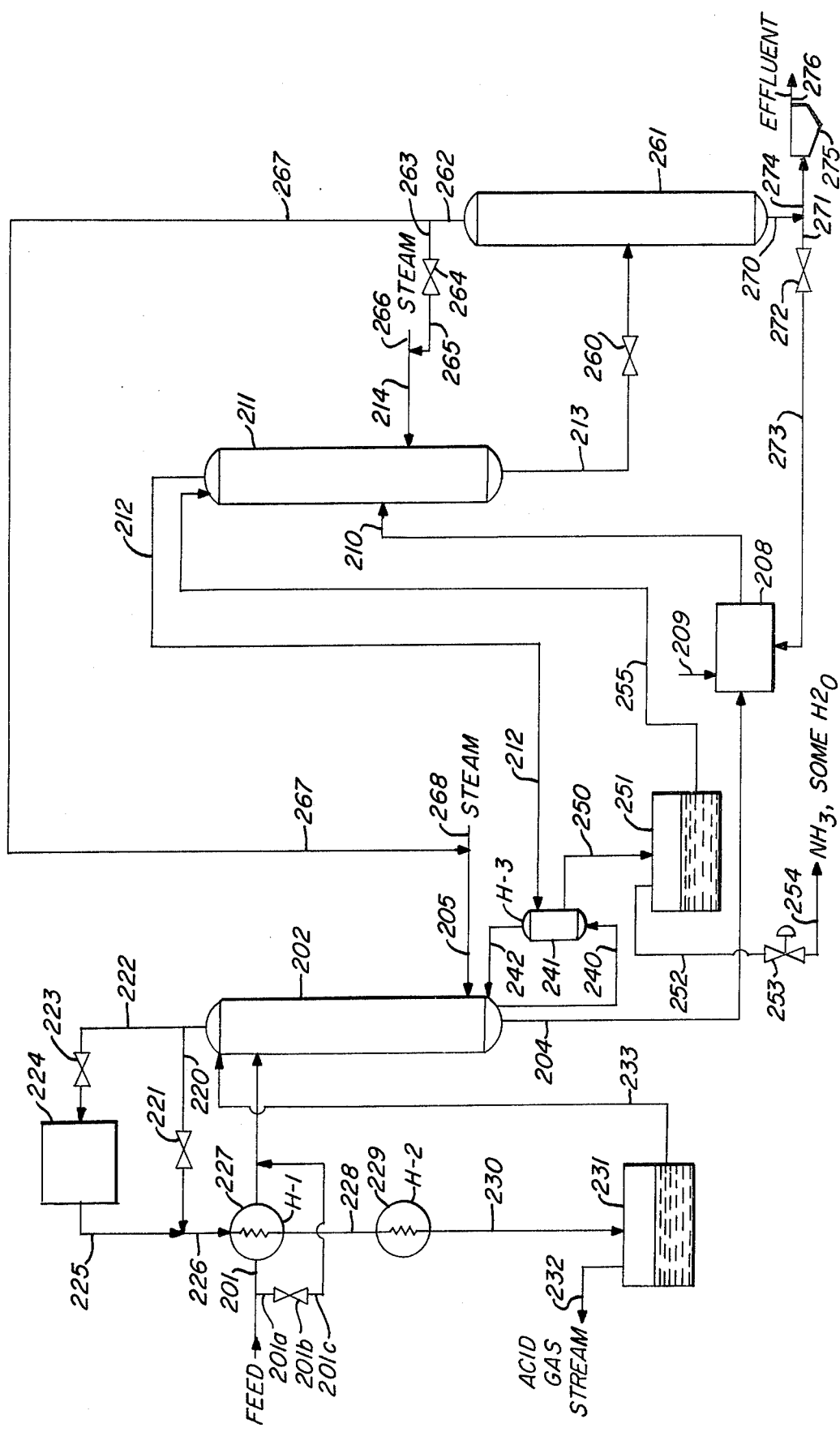

By this invention, it has been found that ammonia and acid gases may be separated from dilute aqueous solutions of these materials which solutions also contain fixed and free ammonium salts by conducting at least two separate and successive distillations of the solutions. The first distillation is performed by heating the solution while maintaining the pH of the solution in a range to decrease the solubility of the acid gases. Vapor withdrawn as overhead from this distillation contains a major proportion of stripping vapor such as steam, and substantially all of the acid gases and free ammonia. The bottom liquid from this distillation are treated with alkali to cause the pH to be increased and is then subjected to a second distillation. In this distillation, the remaining ammonia salts are decomposed by heat in the presence of alkali and ammonia and water vapor are removed as overhead. The bottom liquid from this distillation has a low concentration of ammonia and acid gases. Thereafter this bottom liquid may be further processed for heat recovery as hereinafter described. FIG. 1 is a simplified flow diagram illustrating the basic principles of this invention. FIG. 2 is a simplified flow diagram which includes preferred embodiments of the invention. By conducting the multiple distillations as described, it has been found that there is an improved yield of both acid gases and ammonia, the concentrations of acid gases and ammonia in the liquid effluent can reach and be maintained at desirable low levels, the energy required per gallon of aqueous feed is reduced, and the recovery of the gases is simplified.

In FIG. 1, a simplified flow diagram illustrates the principles of this invention. The aqueous feed composition is a dilute solution of acid gases, ammonia, fixed ammonia salts, and free ammonia salts. This may be waste water from a coke-oven plant or coal-conversion plant or similar installation. This solution flows by line 101 into a first distillation column 102. In this column, the solution is heated and its pH values are in a range to decrease the solubility of acid gases. In the distillation of a multi-component liquid, the upflowing vapor which becomes enriched with the more volatile components of the liquid is described as having a stripping action on the liquid, hence, this vapor is termed a stripping vapor. The stripping vapor may be a condensable gas or a non-condensable gas or a combination of these; e.g., steam, air, hydrogen, nitrogen, and methane. The stripping vapor may be generated by vaporization of the liquid or by injecting vapor into the distillation or by a combination of these. Because this invention concerns distillation of dilute aqueous streams, the stripping vapor will generally comprise a predominant proportion of steam. The overhead vapor leaving the column by line 103 will have a major proportion of stripping vapor such as steam, substantially all of the acid gases and free ammonia. Heat for the first column can be provided by direct injection of steam or other stripping medium or indirect heat exchange or a combination of these; as shown, steam is directly injected into the column by line 105. From the first column, a bottom liquid is withdrawn by line 104 and mixed with an alkaline material in the chamber 108 to increase the pH of the stream; also, grit and other readily separable solids such as precipitates can be removed in the chamber. This bottom liquid stream flows by line 110 to a second distillation column 111. In this column, the liquid is heated and an overhead vapor of ammonia and water is removed by line 112. The conditions in this second column are selected for maximum recovery of ammonia. This column can be heated by direct injection of stripping vapor such as steam or by indirect heat exchange or by combinations of these; as shown, steam is withdrawn by line 113; it has low concentrations of the acid gases and ammonia. It is now suitable for further processing, an example of which is further treatment to provide a quality such that it can be discharged into rivers or reused as a process water. By utilizing the multiple distillation of this invention, low levels of toxic cyanides can be achieved in the effluent so that after biological oxidation, the treated water has such low levels of toxic substances that additional cyanide removal by way of chlorination or the like may be avoided.

As is shown the vapor stream from the second distillation is kept separate from the liquid in the first distillation. It has been found that this separation of second distillation vapors from the first distillation provides optimum equilibrium conditions for removal of acid gases in the first distillation and avoids unnecessary vaporization of second distillation ammonia vapor with subsequent recondensation in the presence of the acid gases. In addition this method of operation permits optimum conditions to be used for recovery of ammonia in the second distillation.

Dilute aqueous solutions which may be treated by this invention are those having acid gases and ammonia in the solution together with fixed and free ammonia salts. By dilute is meant solutions having water as its major component, where the total dissolved acid gases and fixed and free ammonia are up to 10 percent by weight. The acid gases include $CO_2$, $SO_2$, HCN, and $H_2S$. Any one of these may be present by itself or in combination with one or more of the others. The simultaneous low concentration of acid gas and ammonia in the treated solution is an important aspect of this invention. Where the acid gases include $CO_2$, the simultaneous reduction of $CO_2$ and $NH_3$ concentrations in the bottom liquid from the first distillation tends to reduce the amount of sludge produced after lime addition. Where the acid gases include HCN, the reduced concentrations of ammonia and cyanide in the exit water are very useful when activated sludge plants are subsequently used to remove biodegradable materials from the water.

The most common dilute aqueous solutions will contain $CO_2$, $H_2S$, and HCN with $NH_3$ as well as the fixed and free ammonia salts; Van Krevelan et al, Recueil 68 (1949) pp. 191-216 describes the vapor pressures of such solutions as well as the ionic species of acid gas salts and ammonia compounds in such solutions, which would be representative of the aqueous solutions upon which the invention may be practiced.

Where the solution is a waste water of streams collected from coke plants and coal conversion plants, other components may include tars, phenols, fluorides, chlorides, sulfates, thiosulfates, and thiocyanates. In these circumstances, the tars would be removed by decanting and then the ammonia and acid gases would be removed according to the subject invention.

The collected waste waters from coke plants are often referred to as ammoniacal liquors. Most of the ammonia is present in the form of ammonium salts of which there are two kinds—free and fixed. Some ammonia may be present as ammonium hydroxide. "Free" salts are those which are decomposed by boiling, for example, ammonium sulfide $(NH_4)_2S (+steam) = 2NH_3 + H_2S$.

The "fixed" salts are not decomposed unless boiled with an alkali, such as lime, for example, ammonium chloride.

$$2NH_4Cl + Ca(OH)_2 = 2NH_3 + CaCl_2 + 2H_2O$$

The principal free and fixed salts present in the liquors are as follows:

| Free Salts | Fixed Salts |
|---|---|
| ammonium carbonate | ammonium chloride |
| ammonium bicarbonate | ammonium thiocyanate |
| ammonium sulfide | ammonium ferrocyanide |
| ammonium cyanide | ammonium thiosulfate |
| | ammonium sulfate |

In addition to ammonia and ammonium salts, the liquors contain low concentrations of suspended and dissolved tarry compounds. The most important of these compounds are the phenols or "tar acids", the concentration of which usually ranges from about 0.3 to about 15 grams per liter of liquor. Pyridine bases, neutral oils, and carboxylic acids are also present but in much lower concentrations.

Typical compositions of liquors from various sections of the coke oven operation are:

TABLE I

Composition of Weak Ammonia Liquors From Several Coke Plants

| | Ammonia-Recovery Process | | | |
|---|---|---|---|---|
| | Semidirect | | Indirect | |
| Plant | A | B | C | D |
| Ammonia, total, gpl | 7.60 | 6.20 | 4.65 | 3.59 |
| Free, gpl | 4.20 | 4.76 | 3.37 | 2.70 |
| Fixed, gpl | 3.40 | 1.44 | 1.28 | 0.89 |
| Carbon dioxide as $CO_2$, gpl | 2.35 | 3.94 | 2.78 | 1.74 |
| Hydrogen sulfide as $H_2S$, gpl | 0.86 | 0.34 | 1.26 | 1.13 |
| Thiosulfate as $H_2S_2O_3$, gpl | 0.022 | 0.51 | | |
| Sulfite as $H_2SO_3$, gpl | 2.84 | | | |
| Sulfate as $H_2SO_4$, gpl | | 0.15 | | |
| Chloride as HCl, gpl | 6.75 | 1.85 | | |
| Cyanide as HCN, gpl | 0.062 | 0.05 | | |
| Thiocyanate as HCNS, gpl | 0.36 | 0.42 | | |
| Ferrocyanide as $(NH_4)Fe(CN)_6$, gpl | 0.014 | 0.039 | | |
| Total sulfur, gpl | 1.014 | 0.57 | | |
| Phenols as $C_6H_5OH$, gpl | 0.66 | 3.07 | | |
| Pyridine bases as $C_5H_5N$, gpl | 0.48 | 0.16 | 1.27 | 0.98 |
| Organic number, cc N/50 $KMnO_4$ per liter | | | 4856 | 3368 |

TABLE II

Typical Compositions of Flushing and Primary Cooler Liquors

| Liquor | Flushing Liquor, gpl | Primary-Cooler Condensate, gpl |
|---|---|---|
| Total ammonia | 4.20 | 6.94 |
| "Free" ammonia | 1.65 | 6.36 |
| "Fixed" ammonia | 2.55 | 0.58 |
| Total sulfur | 0.668 | |
| Sulfate as sulfur trioxide | 0.212 | |
| Sulfide as hydrogen sulfide | 0.003 | |
| Ammonium thiosulfate | 0.229 | 0.29 |
| Carbonate as carbon dioxide | 0.374 | |
| Cyanide as hydrogen cyaride | 0.002 | |
| Chloride as chlorine | 8.13 | 1.05 |
| Ammonium thiocyanate | 0.82 | |
| Phenols | 3.55 | 3.20 |

A fuller discussion of the recovery of ammonia from coke oven gases and the origin of the various ammonia salt species in the various sections of coke oven plants is given in the book, COAL, COKE AND COAL CHEMICALS, P. J. Wilson and J. H. Wells, McGraw-Hill Book Company, Inc., N.Y., 1950, particularly Chapter 10, pp. 304-325.

The following Table 3 illustrates the range of compositions in coke plant waste water that comprise aqueous solutions especially suitable for the practice of this invention:

TABLE 3

Typical Composition Ranges for Coke Plant Waste Water

| Component | Composition Range, ppm* | Typical Composition, ppm* | | |
|---|---|---|---|---|
| | | Waste Water No. 1 | Waste Water No. 2 | Waste Water No. 3 |
| Free ammonia | 450 to 10000 | 1900 | 770 | 1350 |
| Fixed ammonia | 700 to 4000 | 1900 | 1190 | 2440 |
| Cyanide | 2 to 1000 | 210 | 35 | 65 |
| Sulfide | 0 to 1300 | 500 | 1 | 10 |
| Carbonate | 150 to 4000 | 2180 | 190 | 350 |
| Chloride | 750 to 8500 | 2300 | 1920 | 4460 |
| Sulfate/Sulfite | 150 to 3000 | 310 | 325 | 415 |
| Thiosulfate | 90 to 600 | 440 | 115 | 300 |
| Thiocyanate | 100 to 1000 | 700 | 150 | 310 |
| Total sulfur | 200 to 2000 | 1300 | 250 | 550 |
| Fluoride | 30 to 150 | 60 | 46 | 75 |
| Phenols | 300** to 3600 | 1500 | 400 | 725 |
| pH | 7 to 9.1 | 9.0 | 7.5 | 7.6 |

*Parts per million by weight. **Dephenolized coke plant waste water could contain as little as 0.1 ppm phenols.

The practice of our invention on materials such as described above can be achieved by having two successive and separate continuous distillations each operating under countercurrent multistage separation conditions. In the first distillation, the process conditions are selected so that essentially all of the acid gases and essentially all of the ammonia from the free ammonia salts are vaporized and removed from the solution. The general conditions to achieve this result are to have an inlet feed temperature such that there is substantial rectification in the first distillation, an overhead vapor in a condition for maximum removal of acid gases and ammonia and a bottom stream that is essentially depleted of the free ammonia and said gases.

Because of its desirable physical properties and ready availability, the preferred stripping vapor consists essentially of steams in which minor amounts of non-condensables may be present. The hereinafter specific description of the preferred practice of this invention is made with reference to the stripping vapor being steam. It being understood that due allowance be made for variations in operating conditions where the stripping vapor contains a significant proportion of a non-steam component. The inlet feed temperatures may be in the range of about 60°–212° F., the overhead temperatures in the range of about 140°–265° F., and the bottom temperatures in the range of about 160°–275° F. The first distillation will be conducted at a pressure in the range of about 0.3 to 3.0 atmos. abs. The low part of the pressure range allows for efficient use of low pressure steam while the higher pressures give more efficient removal of cyanides. In the first distillation, the gradient of ammonia concentration is controlled to be decreasing towards the bottom of the column. Thus, substantially all of the free ammonia salts, e.g., sulfide, carbonate and cyanide, are decomposed into ammonia and acid gases that are removed by the stripping vapor. The decreasing ammonia concentration results in decreasing the pH which enhances the stripability of the acid gases in the lower section of the distillation tower. This results in the solution at the bottom of the column becoming mildly acid, ca. pH of about 5 to 6, the acid gases can thus be removed substantially completely from the solution with the result that the still bottoms is also very low in acid gas content. The preferred concentration of ammonia in the first distillation bottom stream is about 40 to 200 ppm. As another aspect of these conditions, if direct injection of steam is used to supply part or all of the heat required for vaporization, then this steam should be substantially free of ammonia so that the pH range in the first distillation can be maintained in the mildly acid range.

The ratio of internal liquid to internal vapor flow should be as high as possible to achieve good economy of operation; the L/V values may be in the range of about 10/1 to 2/1 for this first distillation.

The bottom stream from this first distillation is treated by addition of an alkali, preferably lime, to increase its pH such that the bottoms stream from the second distillation column has a pH of 9.5–12 when measured at 50° C.

The lime reacts with both fixed ammonia salts and any residual acid gases. With respect to the ammonia salts, the principal reaction is with ammonium chloride although ammonium thiocyanide and sulfate also react according to the following equations:

$$2NH_4Cl + Ca(OH)_2 \rightarrow CaCl_2 + 2NH_3 + 2H_2O$$

$$2NH_4SCN + Ca(OH)_2 \rightarrow Ca(SCN)_2 + 2NH_3 + 2H_2O$$

$$(NH_4)_2SO_4 + Ca(OH)_2 \rightarrow CaSO_4 + 2NH_3 + 2H_2O$$

The reactions between lime and any residual acid gases are according to the following equations:

| $CO_2 + Ca(OH)_2$ | $CaCO_3 + H_2O$ |
|---|---|
| $H_2S + Ca(OH)_2$ | $CaS + 2H_2O$ |
| $2HCN + Ca(OH)_2$ | $Ca(CN)_2 + 2H_2O$ |

The major portion of any residual acid gases is $CO_2$ and the calcium carbonate thus formed tends to consume lime and forms additional lime sludge and thus causes scaling or fouling in distillation equipment. The alkali material may also be sodium hydroxide or potassium hydroxide in place of the calcium hydroxide or lime.

The treated stream is subjected to a second distillation. As noted above, the high pH and heat cause the "fixed" ammonia salts to decompose with liberation of the ammonia. The resulting overhead vapors are essentially ammonia and water. The feed temperature may be in the range of about 155°–270° F., the overhead vapors may be at a temperature in the range of about 140°–290° F., and the bottom stream may be at a temperature in the range of about 160°–295° F. The pressure may be up to about 60 psia. The bottoms stream from the second distillation will have a low concentration of total ammonia and of cyanides. The pH will be in the range of 9.5–12. The total ammonia may be as low as 25 ppm. The total cyanides, including complexed cyanides and free cyanides expressed in terms of equivalent HCN concentration [HCN (total)*], may be as low as 2 ppm; the free cyanides, cyanides amenable to chlorination, in some cases may even be less than 1 ppm. This bottom stream can be clarified and then treated to remove other organic materials, such as phenols.

By having the acid gases and free ammonia removed in the first distillation, the second distillation can be conducted for the optimum removal of ammonia from the alkaline fixed ammonia salt solution. Also, the fixed ammonia salt solution will have minimum deposits of salts that arise from the presence of the acid gases. Also, the low concentration of ammonia in the bottoms of the first distillation allows substantially complete removal of acid gases, such as hydrogen cyanide, carbon dioxide, and hydrogen sulfide, from the bottom stream so that the tendency to deposit salts in the second distillation is reduced. It is another benefit of this invention that the various streams may be utilized as heat sources in the distillations to minimize the consumption of energy for achieving effluents with low concentrations of ammonia and cyanide. As well, the overheads of the first distillation may be treated to separate the ammonia and acid gases: the overheads from the second distillation are essentially water and ammonia from which the ammonia may be recovered.

FIG. 2 illustrates the embodiment of the invention in which the process is used to achieve low concentrations of ammonia and cyanide in the effluent water while reducing energy consumption.

A waste water is collected from a coke oven plant and has a composition similar to that set forth in Example 2 hereafter.

It is at a temperature which may vary from about 85° F. in cold weather to about 160° F. in the summer. The feed may be preheated by going through line 201 to heat exchanger 227 to provide a feed temperature of about 160° F. Also, the bypass of line 201a and valve 201b within line 201c permits controlling the fraction of feed water which must be preheated. At about 160° F. the feed is introduced into a first distillation column 202 at a position in the upper half of the column preferably near the top. This stream should be hot enough so that substantial rectification of the liquid will occur in the column; and, excessive steam condensation in the distillation should be avoided. This column is at a pressure of about 1 atmos. abs. and a temperature and pH to remove substantially all of the free ammonia and acid gases from the feed. The overhead vapors are at a temperature of about 204° F. and are mainly water vapor, ammonia, hydrogen cyanide, carbon dioxide, and hydrogen sulfide. These vapors have about 95 percent of the ammonia available from the free ammonium salts and substantially all of the acid gases. The vapors contain about 90 percent steam. The liquid to vapor flow rates below the feed plate are at a ratio of 10:1. The bottom stream is at a temperature of about 218° F. and has a pH in the range of 5-6. It has fixed ammonia salts, fixed cyanide salts, and organic matter, such as phenols.

The overhead vapors from the first distillation leave by line 203 where a fraction may be diverted by line 220 through valve 221 and line 221a directly to the heat exchanger 227 through line 226. The remaining fraction may go by the line 222 through a valve 223 to an ammonia recovery unit 224. A preferred type of unit may be one in which aqueous ammonium phosphate is used to recover ammonia from a mixture having acid gases. Thereafter, the gases go by line 225 to the heat exchanger 227 by line 226. The fraction of gas which is treated to remove ammonia may be the whole of the overhead or a portion thereof. Especially where distillation facilities are available for recovery of the ammonia from the ammonia-water vapor overhead of the second distillation, it is desirable to also recover ammonia from the overhead vapors of the first distillation so that resultant ammonia water vapor mixtures can be combined and treated in a single distillation column for recovery of anhydrous ammonia and water.

In the heat exchanger 227, the vapors are cooled to preheat the feed stream. Because of the temperature of the vapors and the condensation of the vapors, a substantial reduction in the heat required for the overall first distillation is obtained by this heat exchanging to preheat the feed stream. The first heat exchanger 227 may condense from one-half to the whole of the vapor stream with the second heat exchanger 229, via line 228, providing additional condensation capacity. The combination of heat exchangers 227 and 229 gives good control over the degree of vapor condensation and the temperature range of the feed stream to the distillation column. The condensate and vapors, if any, flow by line 230 to a separator 231. In the separator 231, the more volatile acid gases leave as vapor by line 232 while the condensate, a water stream depleted in ammonia and acid gases, returns as reflux by line 233 to the top of column 202. This reflux helps to remove entrained chlorides from the overhead vapors leaving column 202. The vapors leaving the separator have a high ratio of acid gases to ammonia.

The first distillation column may be heated by direct steam injection or indirect heat exchange or both. A preferred combination is shown where low pressure stream is directly injected into the column by line 205, preferably at the bottom of the column, and where overhead vapors from the second distillation are used for indirect heat exchange with liquid from the bottom of the first column. As shown, liquid leaves the bottom of the column 202 by line 240 to enter a reboiler 241. In the reboiler 241, this liquid is vaporized and returned to the column 202 by line 242. The heat for this vaporization is obtained by indirect exchange with the ammonia-rich vapors from line 212. The reboiling of the liquid bottoms having a low pH from the first column helps to achieve substantially complete removal of the ammonia and acid gases from the liquid that is to be treated in the second distillation.

From the first column, a bottom stream is withdrawn by line 204 and is sent to a mixing tank 208 where the pH of the stream is increased. This pH adjustment may be accomplished by adding a strong alkali in the form of dry solids, such as lime, through line 209 or it may be achieved by using a liquid slurry of the alkali in an aqueous vehicle, such as water or clarified bottom liquid resulting from the second distillation. Lime is preferred in that it is relatively inexpensive and forms low solubility calcium salts with fixed cyanides that can be partially removed with the lime sludge.

The treated stream then flows by line 210 to a second column 211 where the second distillation is performed. In this column, the heat and high pH cause the fixed ammonia salts to decompose to release ammonia. The overhead vapors are essentially water and ammonia; these leave by line 212 and are condensed in the reboiler 241 to provide heat for the first column 202. The fluid leaves the reboiler by line 250 to a separator 251. Vapors from the separator are enriched in the more volatile component ammonia compared to the liquid in the separator. These vapors are withdrawn by line 252 through valve 253. This valve can be used to control the pressure in the separator 251, the reboiler 241, and the second distillation column 211. Thus, the valve can be used as a primary control for the process. Liquid from the separator 251 is water with a small amount of ammonia. It goes by line 255 as reflux to the top of the second distillation column 211.

Bottoms from the second column have a low concentration of ammonia and acid gases especially cyanides. These may leave by line 213 through valve 260 to a flashing vessel 261. Because the liquid is at its boiling point under the temperature and pressure of the second column, the liquids may be flashed to a pressure slightly greater than the bottom pressure of the first distillation tower 202 in the flashing vessel. Overhead vapor from the flashing vessel is essentially water vapor and in this condition can be used as low pressure steam. This steam can leave the vessel by line 262. A portion can flow through line 263 and valve 264 into line 265 where it is mixed preferably by steam ejectors with high pressure steam from line 266 for direct injection into the second distillation column through line 214. Another portion can flow by line 267 as make-up steam to be mixed with other low pressure steam from line 268 for direct injection into the first distillation column by line 205.

From the flashing vessel, the processed water may be withdrawn by line 270. A small amount may be recycled by line 271 through valve 272 and line 273 for the slurry vehicle in mixer 208. The remainder of the processed water may be sent by line 274 to a clarifier 275 where flocculation of the suspended insoluble salts will reduce the solids content of the stream. The water is withdrawn by line 276 and may be further treated to reduce its biologically degradable components.

The following examples illustrate the practice of the invention.

EXAMPLE 1

A waste water collected from a coke plant was subjected to distillations in a 20-tray, 1-inch-diameter glass Oldershaw column. The absolute pressure levels were 388 mm Hg in the distillation and 760 mm Hg in the second. The waste water was fed to the top of the column. Bottoms liquids were collected.

TABLE A

| Effect of Pressure on Cyanide Removal | | | | | | |
|---|---|---|---|---|---|---|
| Steam Type, % NH$_3$ | | | 0 | | 0 | |
| Operating Pressure, mm Hg | | | 760 | | 388 | |
| | Feed CN, ppm | | Still Bottoms, Total CN Content | | | |
| Test No. | Total | Fixed | Sample | ppm | Sample | ppm |
| 1 | 276 | 3.2 | 1 | 9.4 | 1 | 15.3 |
| | | | 2 | 10.7 | 2 | 19.1 |
| | | | 3 | 10.9 | 3 | 14.6 |
| | | | Avg. | 10.3 | Avg. | 16.3 |
| 2 | 430 | 3.2 | 1 | 10.0 | 1 | 16.2 |
| | | | 2 | 14.6 | 2 | 20.5 |

TABLE A-continued

| Effect of Pressure on Cyanide Removal | | | | | | |
|---|---|---|---|---|---|---|
| Steam Type, % NH$_3$ | | | 0 | | 0 | |
| Operating Pressure, mm Hg | | | 760 | | 388 | |
| | Feed CN, ppm | | Still Bottoms, Total CN Content | | | |
| Test No. | Total | Fixed | Sample | ppm | Sample | ppm |
| | | | 3 | 11.7 | 3 | 18.8 |
| | | | Avg. | 12.1 | Avg. | 18.5 |
| 3 | 335 | 1.7 | 1 | 7.9 | 1 | 15.3 |
| | | | 2 | 7.3 | 2 | 15.2 |
| | | | 3 | 6.6 | 3 | 14.1 |
| | | | Avg. | 7.3 | Avg. | 14.9 |
| 4 | 332 | 1.6 | 1 | 5.9 | 1 | 7.5 |
| | | | 2 | 6.2 | 2 | — |
| | | | 3 | 5.7 | 3 | 6.9 |
| | | | Avg. | 5.9 | Avg. | 7.2 |

The data in Table A illustrate that more cyanide is removed by conducting the distillation at one atmos. abs. rather than 0.5 atmos. abs.

TABLE B

| Effect of Ammonia Content in Steam on Cyanide Removal | | | | | | | | | | | |
|---|---|---|---|---|---|---|---|---|---|---|---|
| Steam Type, % NH$_3$ | | | | 6 | | 6 | | 0 | | 0 | |
| Operating Pressure, mm Hg | | | | 760 | | 388 | | 760 | | 388 | |
| Test No. | Liquid/Vapor Ratio | Feed CN, ppm | | Still Bottoms Total CN Content | | | | | | | |
| | | Total | Fixed | Sample | ppm | Sample | ppm | Sample | ppm | Sample | ppm |
| 5 | 10 | 327 | 4.9 | 1 | 20.5 | | | 1 | 13.5 | | |
| | | | | 2 | 20.5 | | | 2 | 11.8 | | |
| | | | | 3 | 21.7 | | | 3 | 13.1 | | |
| | | | | Avg. | 20.9 | | | Avg. | 12.8 | | |
| 6 | 10 | 262 | 3.3 | | | 1 | 24.7 | | | 1 | 21.5 |
| | | | | | | 2 | 26.6 | | | 2 | 17.5 |
| | | | | | | 3 | 27.0 | | | 3 | 26.3 |
| | | | | | | Avg. | 26.1 | | | Avg. | 21.7 |
| 7 | 10 | 392 | 3.1 | 1 | 19.6 | | | 1 | 4.5 | | |
| | | | | 2 | 16.1 | | | 2 | 6.2 | | |
| | | | | 3 | 20.1 | | | 3 | 10.0 | | |
| | | | | Avg. | 18.6 | | | Avg. | 6.9 | | |
| 8 | 12 | 194 | 1.8 | 1 | 7.4 | | | 1 | 2.4 | | |
| | | | | 2 | 9.0 | | | 2 | 2.1 | | |
| | | | | 3 | — | | | 3 | — | | |
| | | | | Avg. | 8.2 | | | Avg. | 2.3 | | |

The data in Table B illustrate that the presence of the additional ammonia causes a substantial increase in the cyanide content of the still bottoms and that operation at one atmosphere absolute provided substantially better cyanide removal than operation at 0.5 atmospheres absolute.

EXAMPLE 2

In an apparatus essentially as described in FIG. 2, a waste water collected from a coke plant was treated according to this invention.

The waste water was heated to a temperature of 160° F. in a heat exchanger and then admitted near the top of a first distillation column. The liquid to vapor flow rates were about 10:1. The overhead vapors were at a temperature of 204° F. and 13 psia. The bottom streams were at a temperature of 219° F. and 16.5 psia.

The concentrations of acid gases and ammonia in the first column were as follows:

| | Feed, Wt. % | Overhead, Vol. % | Bottoms, Wt. % |
|---|---|---|---|
| $H_2O$ | 99.56 | 93.7 | 99.99 |
| $CO_2$ | 0.163 | 1.19 | — |

-continued

|  | Feed, Wt. % | Overhead, Vol. % | Bottoms, Wt. % |
|---|---|---|---|
| $NH_3$ (free) | 0.200 | 3.90 | 0.0061 |
| $H_2S$ | 0.0520 | 0.56 | 0.0001 |
| HCN (total)* | 0.0220 | 0.604 | 0.0012 |

The overhead vapors were treated to remove the ammonia, about 95 percent of the ammonia was recovered. Then, these vapors were sent to the heat exchanger for preheating the feed and to the second exchanger cooled with water. From these heat exchangers, the condensate was separated into an acid gas stream and a reflux stream for the first column. These streams had the following compositions:

|  | Acid Gases Vol. % | Reflux Wt. % |
|---|---|---|
| $H_2O$ | 69.3 | 98.4 |
| $CO_2$ | 17.2 | 0.28 |
| $NH_3$ | 2.96 | 0.53 |
| $H_2S$ | 6.96 | 0.23 |
| HCN | 3.50 | 0.54 |

The thermal requirement for the first distillation was supplied by both direct injection of steam (approximately 40% of the required BTUs) and indirect exchange in a bottoms reboiler (approximately 60% of the required BTUs).

This bottom stream was withdrawn and then treated with a slurry of lime in an aqueous vehicle so that its pH was increased such that a pH of 9.5-12 was maintained in the bottoms of the second distillation column. Thereafter, the treated stream was fed to near the top of the second distillation column. The overhead vapors from this column were at 268° F. and 42.4 psia, the bottom stream was at 275° F. and 45.8 psia. Their compositions were as follows:

|  | Overhead Vol. % | Bottoms Wt. % |
|---|---|---|
| $H_2O$ | 96.08 | 99.998 |
| $CO_2$ | — | — |
| $NH_3$ (free) | 3.91 | 0.0005 |
| $H_2S$ | — | 0.0001 |
| HCN (total)* | — | 0.0011 |

This overhead vapor was partially condensed in the reboiler of the first column to supply heat therein. The vapor-condensate mixture was separated under a pressure of 35 psia into a vapor and a liquid with compositions as indicated below. The liquid was utilized for reflux to the second column.

|  | Vapor Vol. % | Liquid Wt. % |
|---|---|---|
| $H_2O$ | 83.2 | 98.44 |
| $CO_2$ | — | — |
| $NH_3$ (free) | 16.8 | 1.55 |
| $H_2S$ | — | — |
| HCN | — | — |

The bottom fraction from the second column was flashed to a pressure of about 17.4 psia. The vapor was essentially pure steam and a part of it was used with high pressure steam for direct injection into the second distillation column. The remainder, approximately 85 percent of the flashed vapor, was directly injected into the first column to supply both heat and ammonia-free stripping steam therein. About 0.48 lb. steam per gallon of feed was recovered by this flashing.

The bottom stream from the flasher was clarified with flocculating agents. A portion was used as the slurry vehicle in the addition of lime to the bottoms from the first distillation column while the remainder was sent to a treatment where aerobic bacteria under the influence of oxygen cause biological degradation of the reactive organic matter remaining in the water.

The effects upon purification of the waste water are illustrated by the following compositions for the initial feed water and for the effluent water sent to the biological treatment system.

|  | Feed, ppm | Effluent, ppm |
|---|---|---|
| Phenols | 1500 | 1270 |
| Oil and Tar | 50 | 9 |
| HCN (total)* | 220 | 12 |
| Total Ammonia | 3800 | 24 |
| Free Ammonia | 2000 | 3 |
| Fixed Ammonia | 1900 | 21 |
| Thiocyanates | 700 | 610 |
| Hydrogen Sulfide | 520 | 1 |
| Sulfates | 1700 | 1130 |
| Chlorides | 2300 | 2000 |
| Carbon Dioxide | 1630 | 0 |
| Calcium | 0 | 2080 |
| Dissolved Solids | 6000 | 5170 |
| BOD |  | 3420 |
| Suspended Solids |  | 88 |

This example represents the achievement of a reduction in ammonia content of more than 99 percent and in cyanide content of about 94 percent. Only about one pound of steam is required per gallon of feed as opposed to conventional ammonia stills which require about 2.0 to 3 pounds of steam per gallon of feed.

EXAMPLE 3

In an apparatus essentially as described in FIG. 2, a waste water collected from a coke plant was treated according to another embodiment of this invention. This waste water was a flushing liquor combined with other coke-plant waste water.

The flushing liquor together with other waste waters were combined and subjected to a preliminary separation of tar, oil, and grit. The waste water had a temperature in the range of 100° to 130° F. and was heated in heat exchangers to a temperature of about 185° F. and entered near the top of the first distillation column. The liquid to vapor flow rates were about 10/1. Overhead vapors were at 12.9 psia and 204° F. Bottoms were withdrawn at 16.0 psia and 216° F. The concentrations of acid gases and ammonia were as follows:

|  | Feed, Wt. % | OH Vol. % | Bottoms Wt. % |
|---|---|---|---|
| $H_2O$ | 99.66 | 96.1 | 99+ |
| $CO_2$ | 0.14 | 0.76 | — |
| $NH_3$ (free) | 0.13 | 2.56 | 0.004 |
| $H_2S$ | 0.05 | 0.41 | 0.0001 |
| HCN (total)* | 0.02 | 0.21 | 0.0008 |

The overhead gases were sent to heat exchangers for preheating the waste water. The mixture of vapor and liquid condensate was separated. The vapor was further compressed and then sent to conventional ammonium sulfate saturators for recovery of ammonia. The liquid was sent as reflux at 190° F. to the top of the first distillation column. The composition of acid gases and reflux were as follows:

|  | Acid Gases Vol. % | Reflux Wt. % |
|---|---|---|
| $H_2O$ | 78.9 | 98.1 |
| $CO_2$ | 5.1 | 0.4 |
| $NH_3$ | 12.6 | 1.1 |
| $H_2S$ | 2.3 | 0.3 |
| HCN | 1.1 | 0.1 |

The thermal requirement of the first distillation was supplied by both direct injection of steam (approximately 33 percent of the required BTUs and indirect heat exchange in a bottoms reboiler (approximately 67 percent of the required BTUs).

The bottoms stream was withdrawn. An aqueous slurry of lime was added to the bottoms stream to raise its pH such that the bottoms stream from the second distillation was maintained in the range of 9.5–12. Thereafter, the treated stream entered as feed near the top of the second distillation column. The overhead vapors from this column were at 242° F. and 26.6 psia; the bottoms stream from the column was at 246° F. and 28 psia and a pH in the range of 9.5–12. Their compositions were as follows:

|  | Overhead Vol. % | Bottoms Wt. % |
|---|---|---|
| $H_2O$ | 97.23 | 99.99 |
| $CO_2$ | — | — |
| $NH_3$ (free) | 2.76 | 0.0088 |
| $H_2S$ | — | 0.0001 |
| HCN (total)* | — | 0.0007 |

The overhead vapor was condensed in the reboiler of the first column to supply heat therein. At 25.7 psia, the condensate was separated into a vapor and a liquid for reflux to the second column. These had the following compositions:

|  | Vapor Vol. % | Reflux Wt. % |
|---|---|---|
| $H_2O$ | 87.78 | 98.97 |
| $CO_2$ | — | — |
| $NH_3$ | 12.22 | 1.03 |
| $H_2S$ | — | — |
| HCN | — | — |

This vapor was combined with the vapors from condensation of overheads from the first column and the resulting gaseous mixture was sent to ammonium sulfate saturators for recovery of the ammonia.

The bottom fraction from the second distillation was flashed to 17.0 psia. In the flashing vessel, a small amount of water was admitted to wash out salts entrained in the flashing. Alkali salts, especially lime, should be removed to avoid corrosion and fouling in the heat exchange equipment. The vapor leaving the flashing vessel was combined with make-up steam and directly injected into the first distillation to supply heat and stripping steam. About 0.26 lb. steam per gallon of feed was recovered by using this flashing.

The bottoms liquid from the flash vessel contained about 90 ppm total ammonia. It was subjected to clarification in which suspended solids were removed. Thereafter, it was sent to treatment with aerobic bacteria in an activated sludge system for reduction in organic matter.

The following comparison of inlet feed and effluent stream illustrates the effect of the invention:

|  | Feed, 0.78 mgd ppm | Effluent, 0.95 mgd ppm |
|---|---|---|
| Oil and Tars | 50 | 9 |
| Phenols | 1280 | 1050 |
| Free Ammonia | 1330 | 53 |
| Fixed Ammonia | 1700 | 34 |
| $CO_2$ | 1375 | 0 |
| HCN (total)* | 185 | 7 |
| $H_2S$ | 490 | 1 |
| Thiocyanate | 620 | 500 |
| Sulfites and Sulfates | 1430 | 720 |
| Chloride | 2020 | 1650 |

This example illustrates the achievement of more than 97 percent reduction in ammonia and about a 95 percent reduction in cyanide. This also uses about 1.2 pounds of steam per gallon of feed and has about 60 percent of its steam requirement satisfied by low pressure steam, ca. 5.5 psig.

It will be appreciated that the above effluent waters are in a suitable condition for further processing by biological degradation of the phenols. The consistent low concentrations of ammonia and cyanide avoid inactivation of the bacteria so that smooth operation of the activated sludge system is achieved.

EXAMPLE 4

When an effluent of the type set forth in Example 2 is subjected to biological oxidation in the form of an activated sludge plant, the concentrations of toxic substances may be reduced as follows: phenol, >1 ppm; thiocyanate, >1 ppm; cyanides amenable to chlorination, >1 ppm.

It is within the practice of this invention to make use of such apparatus, to use additional materials and processes as would be familiar to those skilled in this art. For example, the first and second distillations may be performed in one or more vessels. Also, additional reboilers and other heat exchangers may be used at intermediate locations in both the first and the second distillations. Such variations are equally within the scope of the invention set forth in the claims.

We claim:

1. A process for achieving substantially complete removal of acid gases and ammonia from a dilute aqueous solution thereof, said solution also containing free and fixed ammonia salts, said process comprising:
  (a) subjecting said solution to a first counter-current multi-stage continuous distillation, said distillation being conducted by heating said solution, at least in part by means of a stripping vapor, and by having a gradient of ammonia concentration decreasing towards the region of bottom liquid withdrawal which results in said bottom liquid having a pH of less than about 8.0,
    (i) withdrawing from this first distillation an overhead vapor stream containing a major proportion of stripping vapor, substantially all of said acid gases in said solution, and substantially all of the ammonia from said free ammonia salts, (ii) withdrawing from this distillation an aqueous bottom stream which contains substantially all of said fixed ammonia salts;

(b) adding alkali to said withdrawn bottom stream, said alkali being added in an amount sufficient to evolve ammonia contained in the fixed ammonia salts during subsequent distillation of said mixture, (c) subjecting said withdrawn bottom stream to a second counter-current multi-stage continuous distillation,
 (i) withdrawing from this second distillation an overhead vapor stream said vapor stream containing a portion of the ammonia from the fixed ammonia salts,
 (ii) withdrawing from this second distillation an aqueous bottom stream, (d) vaporizing the aqueous bottom stream of step (a) at least in part, (1) by heating said bottom stream by means of indirect heat exchange with at least a portion of the overhead vapor stream being withdrawn in step (c) and (2) by conducting said first distillation at a pressure substantially less than the pressure of the second distillation.

2. The process of claim 1 wherein said indirect heat exchange includes the condensation of the overhead vapors from step (c) into a liquid fraction and a vapor fraction.

3. The process of claim 2 wherein said liquid fraction is returned to step (c) as reflux for said second distillation.

4. A process for achieving substantially complete removal of acid gases and ammonia from a dilute aqueous solution thereof, said solution also containing free and fixed ammonia salts, said process comprising:

(a) subjecting said solution to a first countercurrent multi-stage continuous distillation, said distillation being conducted by heating said solution, at least in part by means of a stripping vapor, and by having a gradient of ammonia concentration decreasing towards the region of bottom liquid withdrawal which results in said bottom liquid being in the acid range and wherein said distillation is conducted at a pressure in the range of about 0.3 to about 3 atmospheres absolute,
 (i) withdrawing from this first distillation an overhead vapor stream containing a major proportion of stripping vapor comprising steam having a temperature in the range of about 140° to 265° F., substantially all of said acid gases in said solution and substantially all of the ammonia from said free ammonia salts,
 (ii) withdrawing from this first distillation an aqueous bottom stream which contains substantially all of said fixed ammonia salts and has a temperature in the range of about 160° to about 275° F., (b) adding alkali to said withdrawn bottom stream and heating said bottom stream to a temperature in the range of about 155° to about 270° F., said alkali being added in an amount sufficient to evolve ammonia contained in the fixed ammonia salts during subsequent distillation of said mixture, (c) subjecting said withdrawn bottom stream to a second, countercurrent multi-stage continuous distillation,
 (i) withdrawing from this second distillation an overhead vapor stream having a temperature in the range of about 140° to about 295° F., said vapor stream comprising steam and a portion of the ammonia from the fixed ammonia salts,
 (ii) withdrawing from this second distillation an aqueous bottom stream, said bottom stream being substantially free of acid gases and ammonia, and having a temperature in the range of about 160° to about 185° F., (d) vaporizing at least a portion of the aqueous bottom stream of step (a) to form a stripping vapor for use in step (a) by indirect heat exchange with at least a portion of the streams being withdrawn in step (c) to thereby achieve substantially complete removal of the free ammonia and acid gases from the liquid that is to be treated in the second distillation of step (c), and wherein the ratio of solution flow to vapor flow within the columns is in the range of about 10/1 to 2/1 and wherein the first distillation is conducted at a pressure sufficiently less than the pressure of the second distillation to permit the overhead vapors of step (c) to provide sufficient heat by indirect heat exchange to vaporize the aqueous bottom stream of step (a).

5. A process according to claim 4 wherein said indirect heat exchange is by condensation of the overhead vapors from step (c) into a liquid fraction and a vapor fraction.

6. A process according to claim 5 wherein said liquid fraction is returned to step (c) as reflux for said second distillation.

7. A process according to claim 4 including an initial step of heating said aqueous solution by indirect heat exchange with at least a part of the heat contained in the overhead vapors from step (a) so that said solution has a temperature in the range of about 60° to 212° F.

8. A process according to claim 4 wherein said acid gases include at least one member selected from the group consisting of $CO_2$, $SO_2$, $H_2S$, and $HCN$.

9. A process according to claim 8 wherein said member is $HCN$.

10. A process according to claim 4 wherein said aqueous solution includes a flushing liquor.

11. A process according to claim 4 wherein said aqueous solution is an effluent collected from the processing of coke-oven gas.

12. A process according to claim 4 wherein the said aqueous bottom stream from step (c) is subjected to biological degradation to reduce the content of toxic substances in said bottom water stream.

13. A process according to claim 4 wherein said overhead vapor stream withdrawn in step (a) comprises about 90 percent steam.

14. A process according to claim 4 wherein a portion of the heat required to step (a) is supplied by (i) direct injection of a stream comprising steam or (ii) indirect heat exchange with the liquids in step (a) or (iii) a combination of (i) and (ii).

15. A process according to claim 4 including the additional step of removing readily separable solids while adding said alkali to said withdrawn bottoms stream in step (b).

16. A method according to claim 4 wherein at least a portion of the heat required in the distillation of step (c) is supplied by direct injection of a stream comprising steam.

17. A process according to claim 4 wherein said acid gases and said free and fixed ammonia comprise up to 10 percent by weight of said aqueous solution.

18. A process according to claim 4 wherein said aqueous solution also contains tars, phenols, fluorides, chlorides, sulfates, thiosulfates, and thiocyanates, and includes the preliminary step of removing the tars prior to step (a).

19. A process according to claim 18 wherein said tars and phenols are in a concentration of from about 0.3 to about 15 grams per liter of solution.

20. A process according to claim 4 wherein said free ammonia is present in the range of about 50 to 50,000 parts per million.

21. A process according to claim 4 wherein said fixed ammonia is present in the range of about 50 to 50,000 parts per million.

22. A process according to claim 4 wherein said aqueous bottom stream in step (a) has a pH range of about 5 to about 6 when measured at 50° C.

23. A process according to claim 4 wherein said aqueous bottom stream in step (a) has a concentration of free ammonia of about 40 to about 200 parts per million.

24. A process according to claim 4 wherein the vapor stream withdrawn in step (c) has a stripping vapor consisting essentially of steam.

25. A process according to claim 4 wherein step (c) is conducted at a pressure of up to about 60 psia.

26. A process according to claim 4 wherein said alkali added in step (b) is from the group of calcium hydroxide, sodium hydroxide, or potassium hydroxide.

27. A process according to claim 26 wherein said alkali added in step (b) is calcium hydroxide.

28. A process according to claim 27 wherein said alkali is sodium hydroxide.

* * * * *